Sept. 29, 1925.

L. J. KIMMEL ET AL

THERMOSTAT

Filed Dec. 15, 1922

1,555,419

Inventor
Leonard J. Kimmel
George Torreson

By

Attorney

Patented Sept. 29, 1925.

1,555,419

UNITED STATES PATENT OFFICE.

LEONARD J. KIMMEL AND GEORGE TORRESON, OF SPOKANE, WASHINGTON, ASSIGNORS TO ENTERPRISE MANUFACTURING COMPANY, OF SPOKANE, WASHINGTON.

THERMOSTAT.

Application filed December 15, 1922. Serial No. 607,255.

*To all whom it may concern:*

Be it known that we, LEONARD J. KIMMEL and GEORGE TORRESON, citizens of the United States, residing at Spokane, in Spokane County and State of Washington, have invented certain new and useful Improvements in Thermostats, of which the following is a specification.

The present invention relates to improvements in thermostats for use in connection with electric switches, and designed especially to form part of a refrigerating plant of the domestic type. In the well known domestic refrigerating plants where a compressor is utilized for circulating the refrigerant, as brine, through a tank and coils, an electric motor is generally employed for actuating the compressor. And while the thermostat of the present invention is well adapted for many other uses, it is particularly adapted for opening and closing the control switch of the electric circuit which supplies the electric current for such a motor.

The thermostat includes a diaphragm, operated by movement of expanding gas for the control of the electric switch, and the gas charge within the thermostat is subjected to the same temperature of heat existing in the brine or refrigerant of the refrigerating plant. To this end the thermostat is mounted in such relation to the refrigerating plant that when the temperature of the brine or refrigerant reaches above the normal or predetermined degree, the gas within the thermostat is subjected to substantially the same temperature with the result that the gas charge is expanded to actuate the thermostat. The movement of the thermostat causes the closing of the normally open electric switch which controls the motor circuit, thus operating the motor to cause condensation or compression of the brine, with consequent loss of heat. The exchange of heat in the refrigerant causes reduction of temperature in the coils and tank, and as the thermostat is preferably mounted on the tank, the lowering of the temperature of the refrigerant and walls of the tank causes a like lowering of temperature of the gas charge of the thermostat. As the heat is withdrawn from the expanded gas-charge the thermostat is permitted to return to normal position.

In the accompanying drawings we have illustrated one complete example of the physical embodiment of the invention, wherein the parts are combined and arranged according to the best mode thus far devised for the practical application of the principles of the invention, but it will be understood that changes and adaptations may be made in the illustrated device, within the scope of the appended claim.

Figure 1:
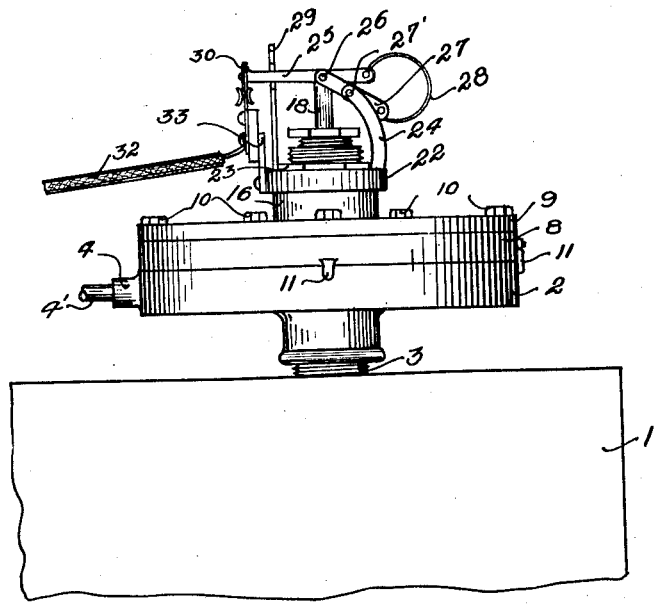
Figure 1 is a view in side elevation of the thermostatic device and electric switch therewith, showing the device mounted on a container, as a brine tank.
Figure 2:
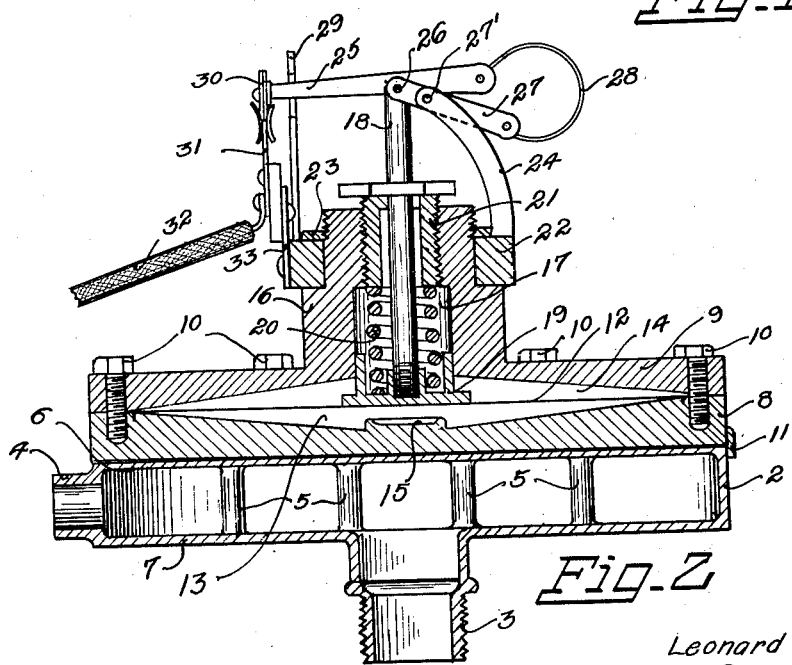
Figure 2 is an enlarged vertical sectional view of the thermostatic device.

In Figure 1 of the drawings a tank or container 1 is shown, which is adapted to form part of a circulation system of a refrigerating plant, or of other type of plant, through which brine, or other fluid, may pass, or be stored. For purposes of illustrating the invention, the tank will be referred to as a brine tank, and the brine, in its circulation passes through a hollow cap 2 mounted on the tank with an inlet nozzle 3 screwed into the wall of the tank 1. An outlet nipple or nozzle 4 is provided for the cap, and the brine pipe is indicated by 4' in Figure 1, it being understood that the brine or refrigerant, in its circulation, passes through the hollow cap by way of the inlet 3 and outlet 4. The cap is fashioned of suitable metal and is of course subject to changes of heat due to differences of temperature of the refrigerant passing therethrough. The cap, however is used merely as a conductor of heat, and is not designed to have any movement, its top wall 6 and bottom wall 7 being connected by integral studs 5 to insure stability and prevent so far as possible relative movement of the walls of the cap due to expansion or contraction under exchange of heat. The heat of the refrigerant contained in the hollow cap is radiated through the walls of the cap, and the thermostatic device is influenced by this heat, with the cap as a conductor of heat.

Upon the flat smooth top surface of the upper wall of the heat conductor or cap is centered the circular, metallic bottom plate 8 having a complementary smooth and flat under surface contacting approximately throughout its entire area with the heat conductor. And a top plate 9 is secured, as by bolts 10, to the base plate or bottom plate 8, thus forming a rigid structure resting on top of the heat conductor, and provided with centering and retaining lugs 11 to engage the top edge of the hollow cap or conductor.

Between these two plates 8 and 9, the diaphragm 12 is retained at its edges and the plates are fashioned with complementary concave faces to provide a lower chamber 13 and an upper chamber 14. The lower chamber 13 is charged with a suitable, expansible gas, which will expand under the action of heat, and the gas is retained within the chamber below the diaphragm, subject to heat radiated or conducted through the base plate 8 from the conductor or radiator cap 2. Thus, when the temperature of the refrigerant in the radiator is imparted to the latter from the former, the radiated heat of the hollow cap is conducted by the base plate 8 to the gas charge in the expansion chamber 13, resulting in an expansion of the gas with consequent action on the diaphragm. In the absence of sufficient heat to expand the gas and elevate the diaphragm, the latter rests normally on a seat 15 located at the center of the bottom concave face of the conductor plate.

The cover plate or top plate 9 is fashioned with a head 16 provided with an interior, cylindrical bore 17 in which an upright stem 18 is reciprocable. At its lower end the stem is provided with a flanged, hollow plunger 19, in the form of a cup, secured to the diaphragm and slidable or movable within the bore 17 of the head 16. Preferably the stem is threaded to its plunger-head, and a spring 20 coiled about the stem is interposed between the plunger head and a hollow screw plug 21 threaded into the upper open end of the head 16. The tendency of the spring is to force the plunger head and diaphragm downwardly and cause the diaphragm to rest upon its seat 15.

The tension of the spring is properly adjusted with relation to the expansive power of the gas charge in the expansion chamber, in order that the pressure exerted by the expanded gas will be sufficient to overcome the spring and elevate the diaphragm, plunger head and stem.

The movement of the stem is designed to actuate an electric switch mechanism, which is supported from the head or boss 16 through a bracket ring 22 which is seated on a shoulder of the boss and secured in place by the threaded washer or nut 23, on the reduced threaded end of the boss 16. A rigid bracket arm 24 rises from the bracket ring and curves toward the stem 18, and the switch lever 25, which is pivoted intermediate its length at 26 at the top of the stem, is disposed at approximately right angles to the stem and adapted to oscillate on its pivot.

A lever arm 27 is also pivoted to the stem at 26 and has an intermediate pivot point 27' on the stationary or rigid bracket arm 24. The switch lever and the lever arm, at their complementary ends are connected by a spring link 28 to insure a steady and cushioned movement of the stem and switch lever, and a slotted, stationary guide plate or bracket 29 is affixed to the bracket ring to limit the movement of the switch lever. Thus, when the stem, under impulse from the expanding gas, is lifted, the switch lever is turned to swing and bring the movable contact member 30 of the knife switch quickly into contact with the complementary stationary member 31 of the switch to close the electric circuit. The wires 32 of the circuit are connected to the insulated post 33, and it will be apparent that when the switch is closed, due to the presence of heat or an undesired high temperature in the refrigerant, the closing of the switch causes the electric motor to be operated, resulting, in time, in a reduction of the temperature of the refrigerant. As the refrigerant is cooled, the gas charge in the expansion chamber is similarly affected, resulting in a reduced volume of the gas, which permits the diaphragm and plunger to be pushed downwardly by action of the spring 20. The movement of the stem is imparted to the switch lever, which is swung on its pivot 26, withdrawing the member 30 quickly from member 31, breaking the circuit, and of course the motor is rendered powerless.

In this manner the operation of the motor is controlled and regulated, the motor being automatically started and stopped with the changing conditions of the refrigerant through the medium of the radiator and conductor members as described.

The gas charge in the expansion chamber is subject to rapid changes in volume, and the thermostatic control device therefore responds quickly to changing conditions, while the springs 20 and 28, in addition to their functions of returning their parts to normal position, also act as cushions to insure a flexible and smooth movement of the operating parts of the device.

The thermostatic control device, while forming an element in the refrigerating plant, is quickly detachable therefrom for purposes of repair, or for substitution of an operative device, should the one in use cease to function properly.

Having thus fully described the invention, what is claimed herein is:—

The combination with a heat conductor comprising a base plate and top plate having complementary concave inner faces to form a chamber and a seat formed on the concave face of the base plate, of a diaphragm within said chamber subject to influence of expansible gas therein, a hollow head on the top plate, a plunger secured to the diaphragm and guided by said head, a stem on the plunger and a spring in said head for returning the plunger and diaphragm to normal position, a bracket ring on the head and a rigid bracket arm thereon, an electric switch including a lever pivoted to said stem, a lever arm pivotally connected to said stem and bracket arm, and a spring connecting said lever and lever arm.

In testimony whereof we affix our signatures.

LEONARD J. KIMMEL.
GEORGE TORRESON.